A. Putnam.
Feed Troughs.
N° 76,810.   Patented Apr. 14, 1868.

Witnesses
H. C. Ashketter
Theo Tische

Inventor
Amos Putnam
per Munn & Co.
Attorneys

United States Patent Office.

AMOS PUTNAM, OF VERNON, BIG BEND POST OFFICE, WISCONSIN.

Letters Patent No. 76,810, dated April 14, 1868.

IMPROVEMENT IN SWING SHEEP-FEEDER.

The Schedule referred to in these Letters Patent and making part of the same.

TO ALL WHOM IT MAY CONCERN:

Be it known that I, AMOS PUTNAM, of Vernon, (Big Bend post office,) in the county of Waukesha, and State of Wisconsin, have invented a new and improved Swing Sheep-Feeder; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

My invention has for its object to furnish a means by which sheep may be fed quicker and with less annoyance than is possible when the feeding is done in the ordinary manner, and with the ordinary means.

And it consists in the use of a double slide or spout pivoted to the frame of a shed or other framework, and swinging in such a way as to guide the hay or other feed into one or the other of two adjacent racks, cribs, or troughs, as hereinafter more fully described.

A is a frame, which may be a part of the framework of a sheep-shed or barn, or which may be built expressly to support the slide or feeder B.

C represents the flooring of the scaffold or other place upon which the hay or other feed is stored, and from which it is to be transferred to the racks, cribs, or troughs, from which the sheep feed.

Figure 1:
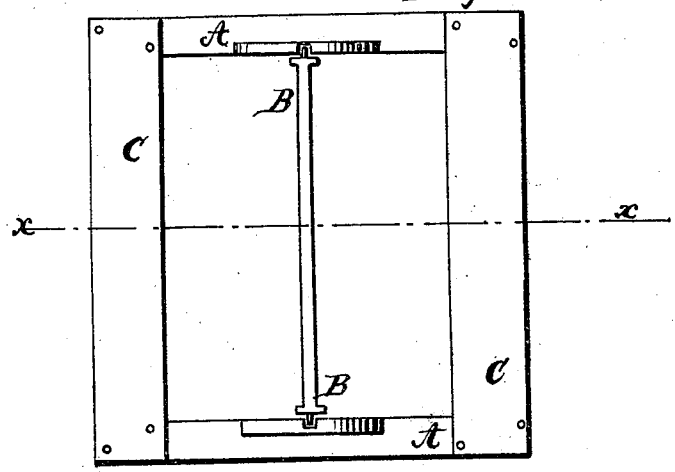
Figure 1 is a top or plan view of my improved sheep-feeder attached to a frame, and showing in red lines the relative position of the racks, cribs, or troughs.
Figure 2:
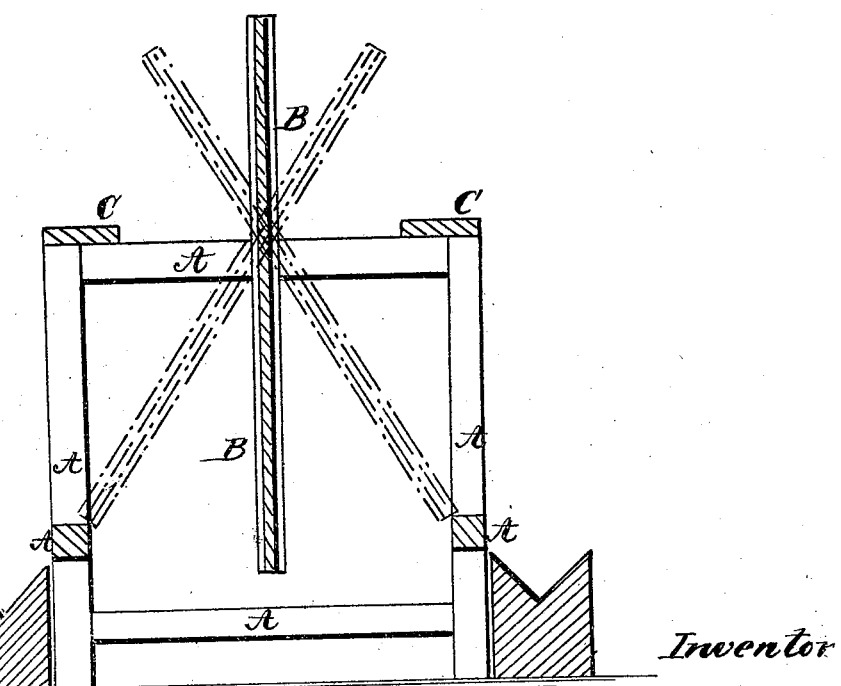
Figure 2 is a vertical cross-section of the same, taken through the line $x\ x$, fig. 1.

The feeder or slide B is made with flanges or ledges projecting upon both sides from each of its side edges, as shown in fig. 1, and is of such a length, and is pivoted directly over the space between two parallel racks in such a way that its lower end, when swung to one side, shall be directly over one of the said feeding-racks, cribs, or troughs, and when swung in the other direction, may be directly over the other rack, crib, or trough.

The upper end of the feeder B should extend so far above the floor C that when its lower end is swung to either side, its said upper end may cover the one part of the hole or opening in the floor C, within which it is pivoted.

The breadth of the feeder must depend upon the length of the feeding-racks and the breadth of the shed in which it is placed.

Any desired number of the feeders B may be used, according to the extent of the shed or sheds, and the number of sheep to be fed.

The upper end of the feeder B, which projects above the floor C, should be made sufficiently heavy to balance or hold said feeder in place while in use.

I claim as new, and desire to secure by Letters Patent—

The removable spout B, hung in open bearings within the opening in the floor C, and provided with flanges on both faces and at both sides, when so arranged that as its lower end is swung to either side, its upper end will cover one part of the opening in the floor C, whereby hay or other feed is conveyed from said floor C, into either one of the parallel racks, cribs, or troughs, as set forth.

AMOS PUTNAM.

Witnesses:
P. H. CARNEY,
JOSEPH KAY.